US 7,530,782 B2

(12) United States Patent
Barnett et al.

(10) Patent No.: US 7,530,782 B2
(45) Date of Patent: May 12, 2009

(54) FOREIGN OBJECT DAMAGE RESISTANT VANE ASSEMBLY

(75) Inventors: Barry Barnett, Markham (CA); Bruce Fielding, Glen Williams (CA)

(73) Assignee: Pratt & Whitney Canada Corp., Longueuil (CA)

( * ) Notice: Subject to any disclaimer, the term of this patent is extended or adjusted under 35 U.S.C. 154(b) by 493 days.

(21) Appl. No.: 11/223,129

(22) Filed: Sep. 12, 2005

(65) Prior Publication Data

US 2007/0237632 A1    Oct. 11, 2007

(51) Int. Cl.
  *F01D 9/00* (2006.01)
(52) U.S. Cl. .................. 415/119; 415/189; 415/190; 415/191
(58) Field of Classification Search .................. 415/119, 415/189, 190, 191
See application file for complete search history.

(56) References Cited

U.S. PATENT DOCUMENTS

| | | | |
|---|---|---|---|
| 3,501,247 A | 3/1970 | Tournere | |
| 3,849,023 A | 11/1974 | Klompas | |
| 3,985,465 A | 10/1976 | Sheldon et al. | |
| 4,180,371 A | 12/1979 | Ivanko | |
| 4,305,696 A | 12/1981 | Pask | |
| 4,655,682 A * | 4/1987 | Kunz et al. | 415/119 |
| 4,820,120 A | 4/1989 | Feuvrier et al. | |
| 4,820,124 A | 4/1989 | Fried | |
| 4,907,944 A | 3/1990 | Kroger et al. | |
| 4,940,386 A | 7/1990 | Feuvrier et al. | |
| 5,074,752 A | 12/1991 | Murphy et al. | |
| 5,269,649 A | 12/1993 | Kiefer et al. | |
| 5,399,069 A * | 3/1995 | Marey et al. | 415/209.3 |
| 5,494,404 A | 2/1996 | Furseth et al. | |
| 5,547,342 A | 8/1996 | Furseth et al. | |
| 6,409,472 B1 | 6/2002 | McMahon et al. | |
| 6,494,677 B1 | 12/2002 | Grady | |
| 6,543,995 B1 | 4/2003 | Honda et al. | |
| 6,595,747 B2 * | 7/2003 | Bos | 415/209.4 |
| 6,854,960 B2 | 2/2005 | Van Dine et al. | |
| 2005/0022501 A1 | 2/2005 | Eleftheriou et al. | |
| 2005/0109013 A1 | 5/2005 | Eleftheriou et al. | |

FOREIGN PATENT DOCUMENTS

GB    2427900 A *    7/2005

* cited by examiner

*Primary Examiner*—Igor Kershteyn
(74) *Attorney, Agent, or Firm*—Ogilvy Renault LLP (57) ABSTRACT

A vane assembly for a gas turbine engine including a shroud with openings defined about a circumference of the shroud and vanes extending radially from the shroud with a vane tip in each opening. Isolating apparatus are disposed in each opening to isolate the vane tip from the shroud ring. Each vane tip is engaged with the shroud by retaining apparatus for restricting movement of the vane tip in an axial direction relative to the shroud.

11 Claims, 7 Drawing Sheets

_Fig. 7_

FOREIGN OBJECT DAMAGE RESISTANT VANE ASSEMBLY

TECHNICAL FIELD

The invention relates generally to gas turbine engines, and particularly to improved vanes provided therein downstream of the engine fan or low pressure compressor.

BACKGROUND OF THE ART

Gas turbine engine vane assemblies are usually provided downstream of the engine fan and/or of a low pressure compressor to reduce the swirl in the air flow exiting the compressor. Such vane assemblies must be resistant to foreign object damage while having a minimum weight.

It is known to provide an inner shroud with slots receiving the vane tips in order to retain them. In such a configuration, a grommet is inserted in the slot such as to surround the vane tip thereby isolating the vane tip from the shroud. However, during a foreign object damage event a vane which is hit will move rearward as a result of the impact, and the vane edge, which tends to be sharp, can cause cutting of the grommet and damage to other surrounding components. Also, the airflow surrounding the grommets often produces a force which tends to lift and displace the grommets, thus requiring the use of adhesive or other similar measures to ensure that they stay in place. Such a use of adhesive complicates the installation and replacement of vanes. Moreover, the protruding grommets can disturb the airflow, which can alter the engine's performance.

Accordingly, there is a need to provide an improved vane assembly.

SUMMARY OF THE INVENTION

It is therefore an object of this invention to provide an improved vane assembly.

In one aspect, the present invention provides a vane assembly comprising: a shroud including an annular shroud ring and a shroud web radially extending from one side thereof, the shroud ring including a plurality of openings defined therethrough about a circumference thereof in alignment with said shroud web such that the shroud web extends across the openings; a grommet located in each of the plurality of openings having a cutout therein; and a plurality of vanes supported by and extending radially from the shroud ring opposite of the shroud web, each one of the plurality of vanes having a vane extremity located in the cutout one of the grommets, the vane extremity having a slot defined therein which receives a portion of the shroud for mating therewith.

In another aspect, the present invention provides a vane assembly for a gas turbine engine, the vane assembly comprising: a vane shroud having a shroud ring portion including a plurality of openings defined therethrough about a circumference thereof, a web portion extending radially from the shroud ring portion across the plurality of openings; a plurality of vanes extending radially from a side of the shroud ring portion opposite the web portion, each of said vanes having a vane tip received within one of the openings; means for isolating said vane tip from said shroud ring portion being disposed in each of the openings; and each of said vane tips being engaged with said vane shroud by retaining means for restricting movement of the vane tip in an axial direction relative to said vane shroud.

In another aspect, the present invention provides a method for attaching a vane tip in a vane assembly of a gas turbine engine, the method comprising the steps of: forming a shroud ring having a plurality of openings distributed about a circumference thereof and a web extending radially from the shroud ring across the plurality of openings; installing a grommet in each of the plurality of openings, such that a cutout extending therethrough is aligned with the openings; providing a plurality of vanes, each having a radially extending slot defined in a vane tip thereof; and inserting each vane tip into said cutouts of the grommets within said opening of the shroud ring so that the web is received within each radially extending slot.

There is also provided, in accordance with another aspect of the present invention, a vane for a vane assembly of a gas turbine engine, the vane assembly including a plurality of said vanes mounted to a supporting shroud via intermediate grommets, each said vane comprising an airfoil extending radially from a root portion to an opposed tip and defining a leading edge and a trailing edge corresponding to a flow direction of air passing through the vane assembly, the root portion being adapted to be mounted to the supporting shroud of the vane assembly, said tip having a slot defined therein between said leading and trailing edges of said airfoil, said slot being configured to receive a portion of the supporting shroud therein for mating therewith, thereby restricting movement of said vane tip relative to the supporting shroud in at least said flow direction.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
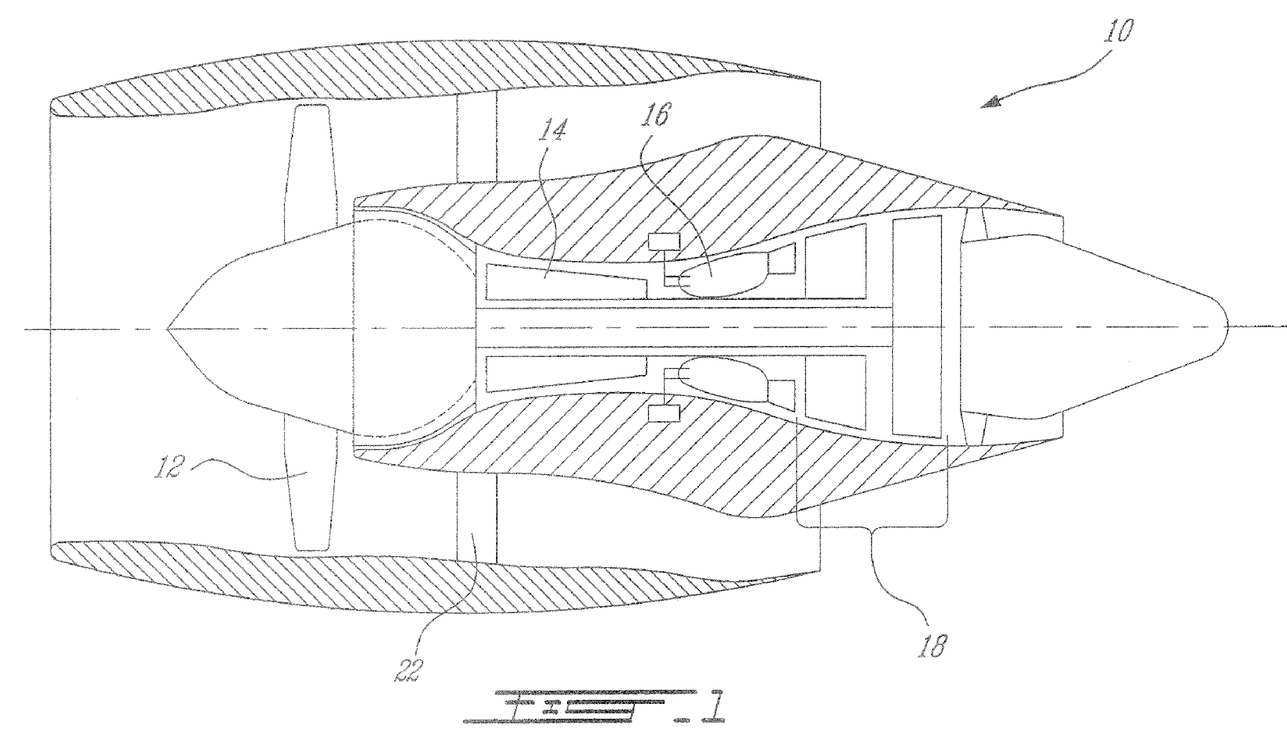
FIG. 1 is a side view of a gas turbine engine, in partial cross-section.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine 18 for extracting energy from the combustion gases.

Figure 2:
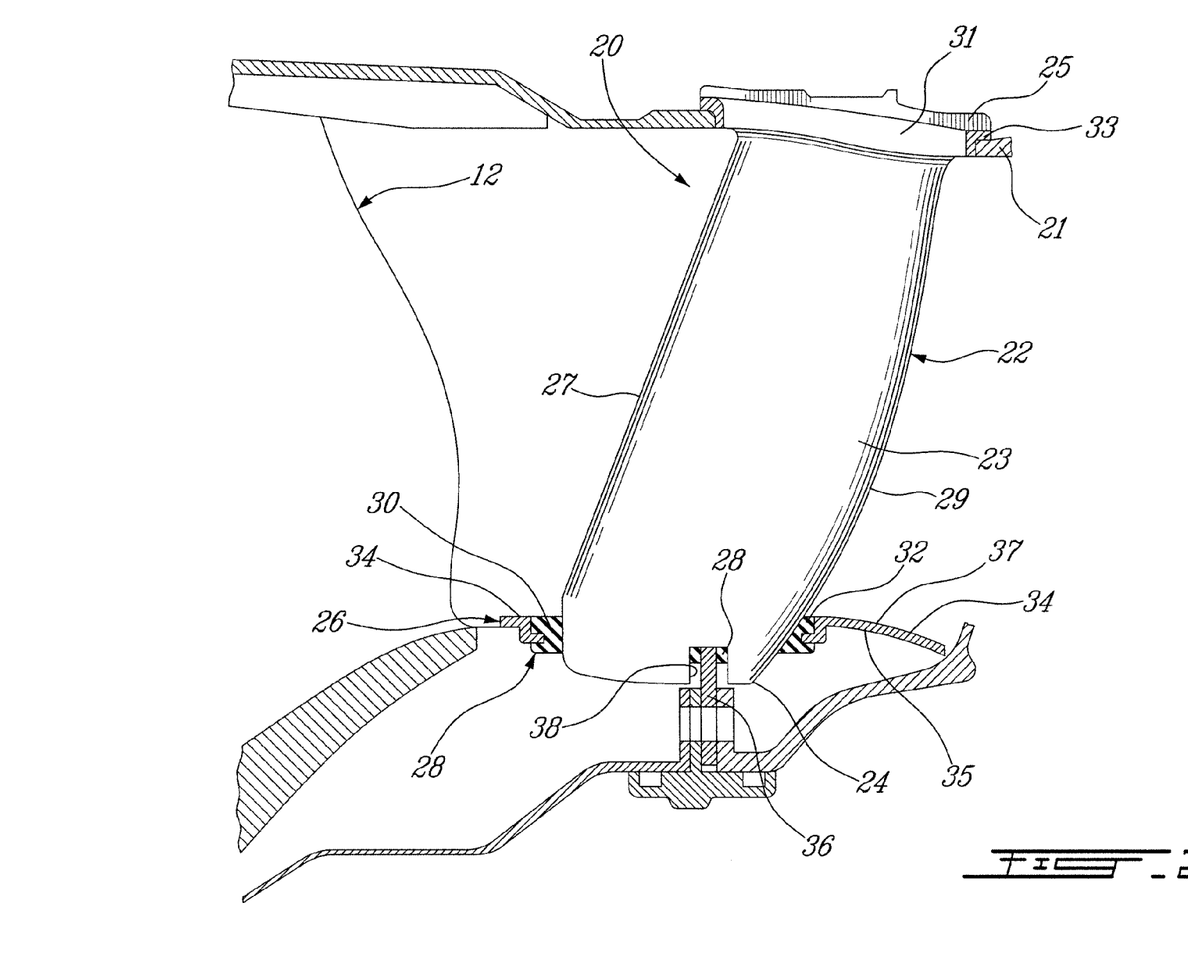
FIG. 2 is a side cross-sectional view of a vane assembly according to an embodiment of the present invention.

Referring to the FIG. 2, the vane assembly 20 is located downstream of the fan 12. The vane assembly 20 includes an inner shroud 26 and a plurality of vanes 22 extending radially between the inner shroud 26 and an engine casing or an outer shroud 21. The inner shroud 26 includes a shroud ring 34 and a shroud web 36. Each of the vanes 22 has an airfoil portion 23 extending between the vane tip 24 and the vane root 25. The vane root 25 is attached to the outer shroud 21 and the vane tip 24 is retained in a grommet 28 inserted into an opening 54 (see FIG. 5) of the shroud ring 34. Throughout this description, the axial, radial and circumferential directions are defined respectively with respect to the central axis, radius and circumference of the shroud ring 34.

Figure 3:
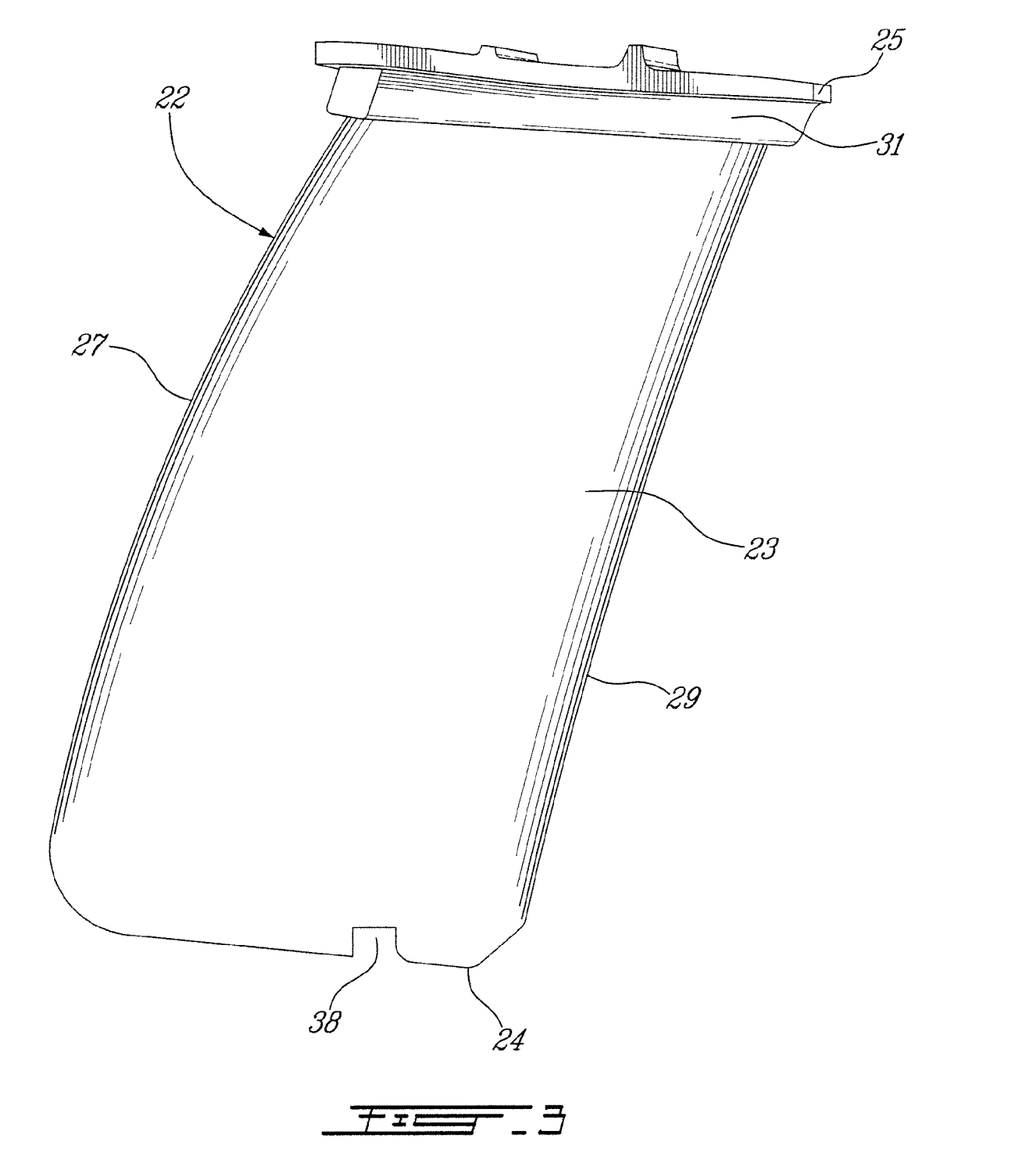
FIG. 3 is a perspective side, view of a vane which is part of the assembly shown in FIG. 2.

As seen in FIGS. 2 and 3, the airfoil portion 23 of each vane 22 defines a leading edge 27 and a trailing edge 29, such that an airflow passing through the vane assembly 20 will flow from the leading edge 27 to the trailing edge 29. The vane tip 24 includes a slot 38 defined therein and located between the leading and trailing edges 27, 29. The slot 38 has a generally rectangular shape and extends radially from the vane tip 24. At the opposite extremity of the vane 22 proximate the vane root 25 is disposed a button portion 31, which corresponds generally to the shape of the airfoil portion 23 however is slightly enlarged relative thereto, but nevertheless remains smaller than the adjacent vane root 25. The button portion 31 includes relatively blunt leading and trailing ends. As seen in FIG. 2, the button 31 is received within an outer grommet 33 disposed within the outer shroud 21 proximate the root end of the vane 22. The blunt vane button 31 accordingly helps to prevent the relatively sharp leading and trailing edges 27 and 29 of the vane airfoil 23 from tearing the outer grommet 33 during the assembly and/or disassembly process of the vane assembly or in the event of a bird strike.

Figure 4:
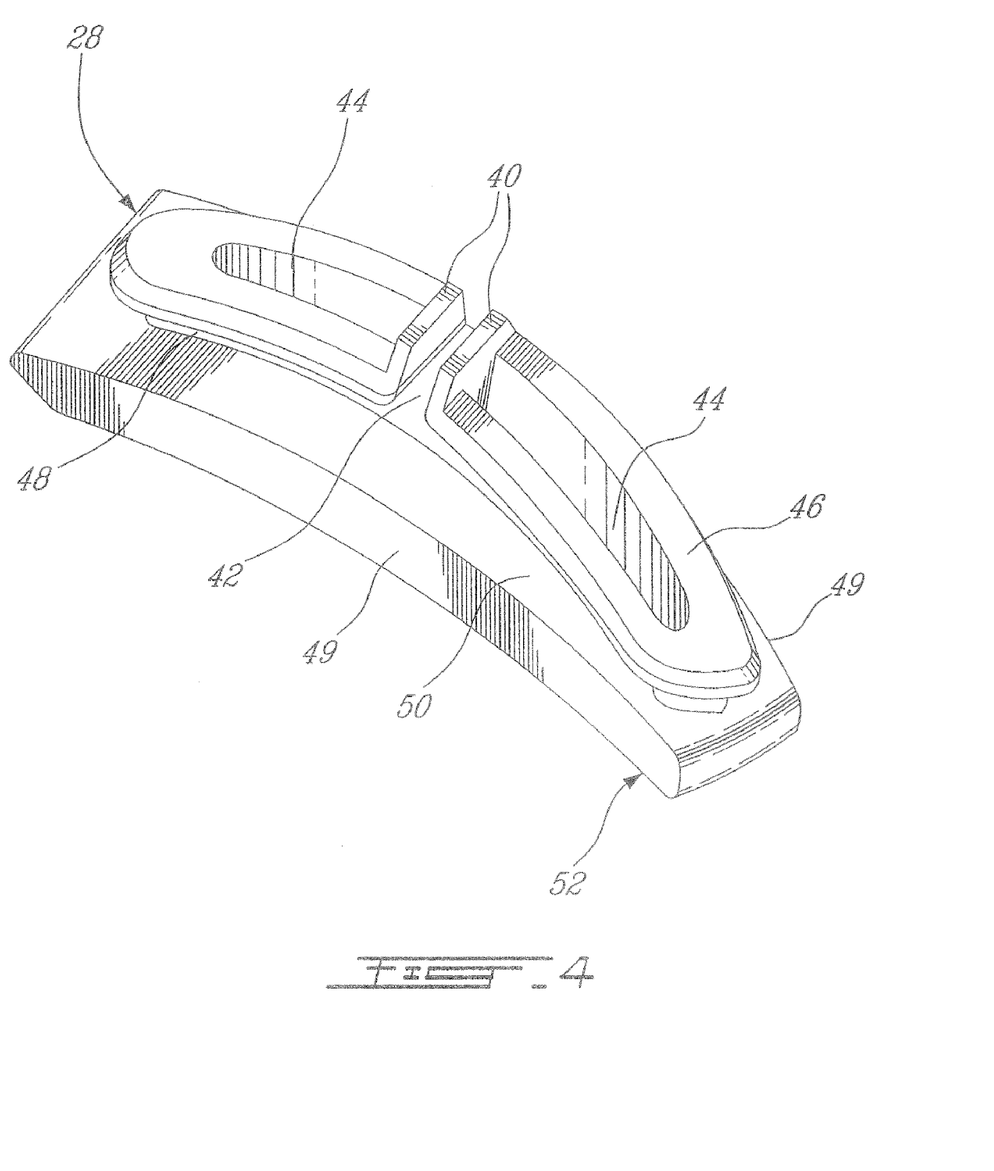
FIG. 4 is a perspective underside view of a grommet which is part of the assembly shown in FIG. 2.

Referring to FIG. 4, each grommet 28 includes a base portion 50 connected to a lip 46 by a recessed portion 48. The base portion 50 defines two opposite elongated lateral surfaces 49 extending generally along the axial direction. Two spaced apart tongues 40 extend perpendicularly from the lip 46 along the circumferential direction and define a slit 42 therebetween. A cutout 44 corresponding in shape to the vane tip 24 is defined within the grommet 28, extends through the base and recessed portions 50, 48, and is bordered by the lip 46. The grommet 28 also has a leading edge 30 and a trailing edge 32 connecting the lateral surfaces 49 and corresponding to the leading and trailing edges 27, 29 of the associated vane 22, as can be seen in FIG. 2. The grommets 28 are preferably made of a flexible material, such as rubber or the like, in order to be able to dampen vibrations of the assembly.

Figure 5:
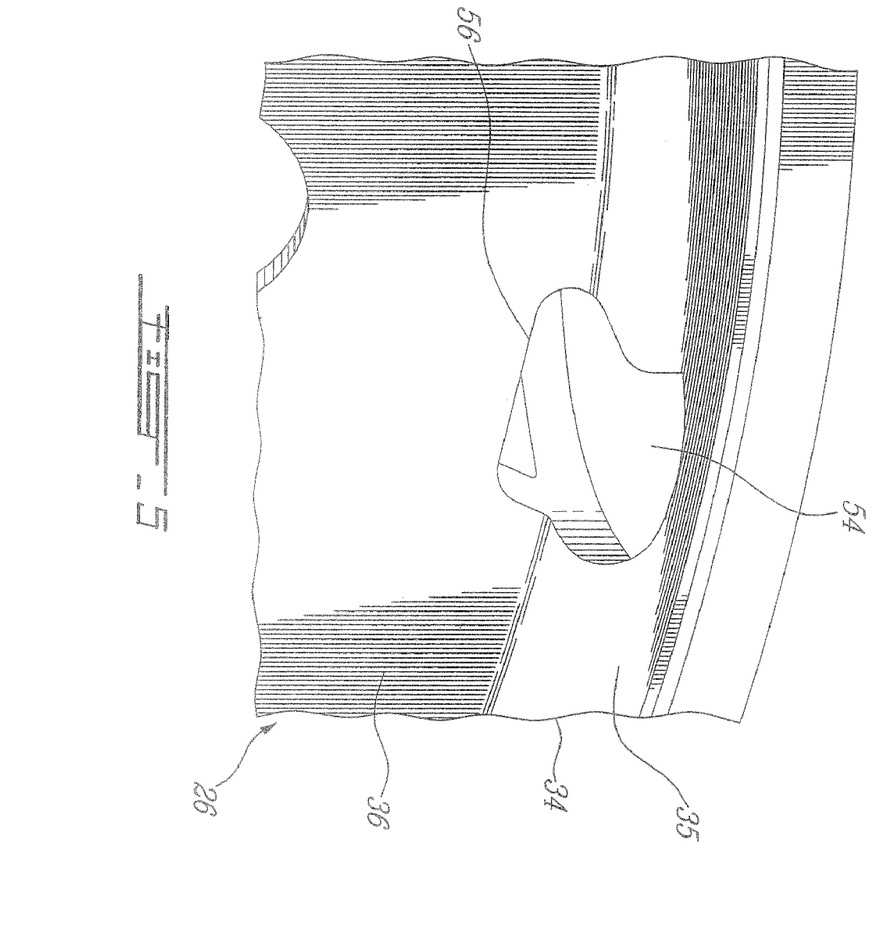
FIG. 5 is a perspective side view of a portion of an inner shroud which is part of the assembly shown in FIG. 2.

Referring to FIGS. 2 and 5, the shroud ring 34 has an inner surface 35 and an outer surface 37 defining a circumference of the shroud 26. The shroud web 36 is circular and extends generally radially from the inner surface 35 of the shroud ring 34 around the entire circumference thereof. The openings 54 are distributed along the circumference of the shroud ring 34. Each opening 54 corresponds in shape to the recessed portion 48 of one of the grommets 28 and is oriented according to a desired orientation of the vane 22 within the airflow. Thus, a grommet 28 is receivable within each opening 54, with the base portion 50 thereof abutting the outer surface 37 and the lip 46 abutting the inner surface 35. Adjacent to each opening 54, a mating slot 56 is defined within the shroud web 36.

Figure 6:
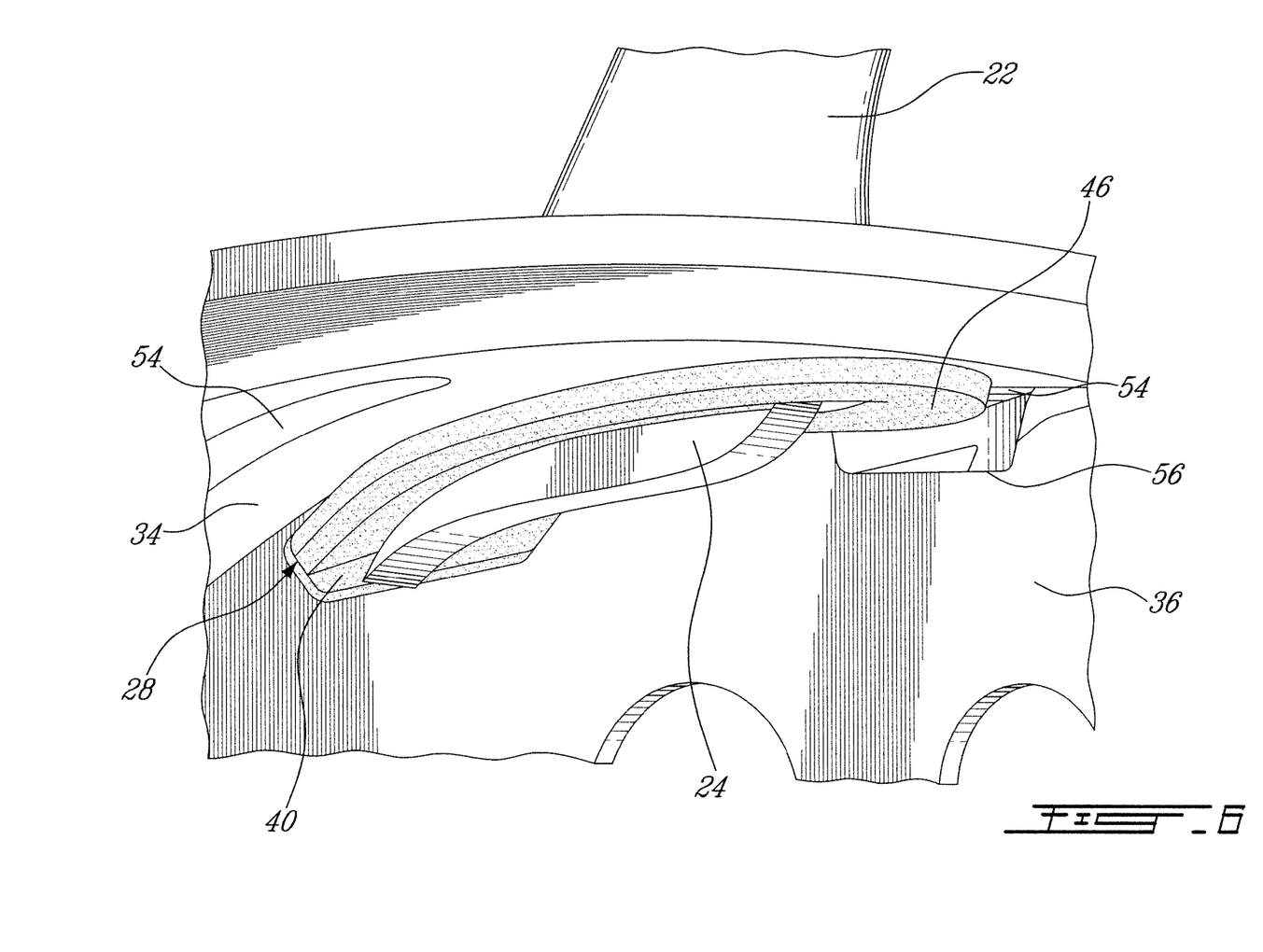
FIG. 6 is a perspective side view of a portion of the assembly shown in FIG. 2, showing a mating of the vane, grommet and inner shroud.

Referring to FIGS. 2, 4 and 6, each of the openings 54 of the shroud ring 34 receives the recessed portion 48 of a grommet 28. The shroud web 36, at the mating slot 56, is received within the slit 42 of the grommet 28, with one of the tongues 40 abutting each side of the web 36. The vane tip 24 is inserted into the grommet cutout 44, the tongues 40 and shroud web 36 being received within the vane slot 38. Alternately, it is also possible to provide a deeper grommet slit 42 and vane slot 38 such as to eliminate the need for the mating slot 56.

Figure 7:
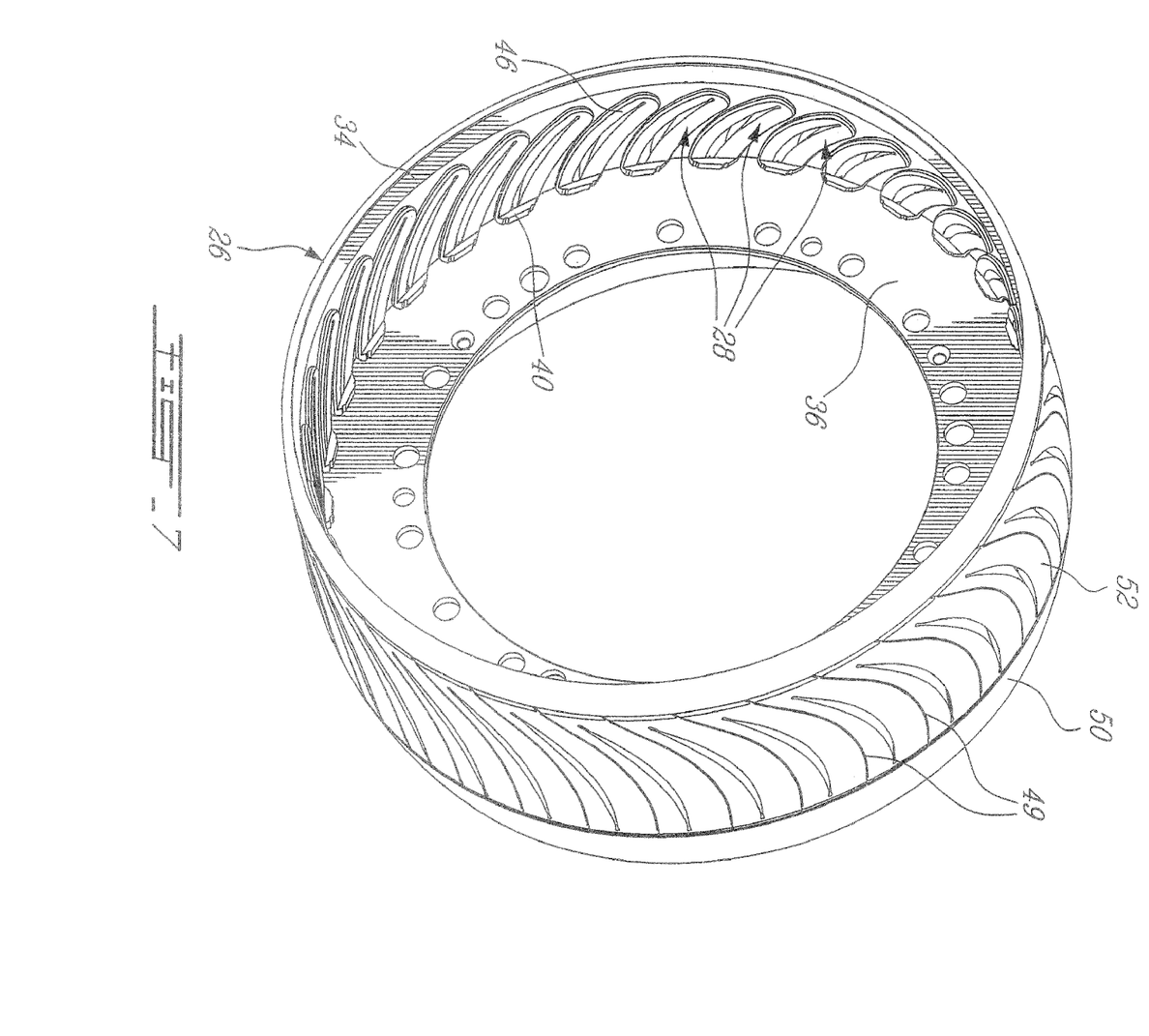
FIG. 7 is a perspective side view of an inner shroud and grommet assembly according to the present invention.

Referring to FIGS. 4 and 7, the base portion 50 of each grommet 28 is shaped so that upon installation of the grommets 28, the lateral surfaces 49 of each grommet 28 will be in close contact with the lateral surfaces 49 of adjacent grommets 28, such that the base portions 50 together form a continuous gas path surface 52 along the entire circumference and at least an axial portion of the shroud 26. This configuration eliminates the need to use adhesives or similar measures to maintain the grommets in position, since the gas flows over the grommets, "pushing" them radially inward, instead of flowing between them and producing a lifting force thereon. The airflow is also smoother since it is not perturbed by an uneven surface which would be produced with conventional grommets having free spaces therebetween.

Alternatively, it is possible to provide an annulus portion or an entire annulus formed by the combined base portions 50 of the grommets 28, which are integrally connected to each other through the lateral surfaces 49 to form a single unit. In the case of an entire annulus, the grommets 28 would have to be made of a material sufficiently elastic to be able to stretch the annulus for insertion of the grommet lips 46 in into the shroud openings 54.

The vane assembly 20 thus efficiently retains the vane tip in the axial direction, providing additional stability to the vane position which reduces the risk of rearward movement of the vane tip 24 upon impact of a foreign object. This, in turn, reduces the risk of damage to the grommet 28 and adjacent components upon the impact of the foreign object. The vane slot 38 and mating slot 56 are easy to machine, and the grommet 28 with tongues 40 and slit 42 can be manufactured using the same process as other types of grommets.

The vane assembly 20 eliminates the need for adhesives or the like to maintain the grommets in place, which reduces costs and simplifies production and maintenance operations.

The above description is meant to be exemplary only, and one skilled in the art will recognize that changes may be made to the embodiments described without department from the scope of the invention disclosed. For example, the vane assembly 20 can be used for other types of engine stators as well as in different fields, such as in ventilation systems. The grommets 28 can be used in outer shrouds as well as other types of vanes or rotor blades. Still other modifications which fall within the scope of the present invention will be apparent to those skilled in the art, in light of a review of this disclosure, and such modifications are intended to fall within the appended claims.

The invention claimed is:

1. A vane assembly comprising:
   a shroud including an annular shroud ring and a shroud web radially extending from one side thereof, the shroud ring including a plurality of openings defined therethrough about a circumference thereof in alignment with said shroud web such that the shroud web extends across the openings;
   a grommet located in each of the plurality of openings having a cutout therein; and
   a plurality of vanes supported by and extending radially from the shroud ring opposite of the shroud web, each one of the plurality of vanes having a vane extremity located in the cutout one of the grommets, the vane extremity having a slot defined therein which receives a portion of the shroud for mating therewith.

2. The vane assembly according to claim 1, wherein said slot defined in the vane extremity radially extends from a tip thereof, said slot receiving a portion of the shroud web therein.

3. The vane assembly according to claim 1, wherein each one of the plurality of grommets includes a lip bordering the cutout and a pair of space apart tongues extending radially from the lip, the pair of spaced apart tongues defining a slit within the lip receiving the shroud web, and the radially extending slot of each of the plurality of vanes receives the spaced apart tongues and the shroud web.

4. The vane assembly as defined in claim 1, wherein the shroud web includes a mating recess adjacent to each of the plurality of openings, the radially extending slot of each of the plurality of vanes receiving the shroud web at the mating recess.

5. The vane assembly as defined in claim 1, wherein the shroud is part of an inner shroud.

6. A vane assembly for a gas turbine engine, the vane assembly comprising:
  a vane shroud having a shroud ring portion including a plurality of openings defined therethrough about a circumference thereof, a web portion extending radially from the shroud ring portion across the plurality of openings;
  a plurality of vanes extending radially from a side of the shroud ring portion opposite the web portion, each of said vanes having a vane tip received within one of the openings;
  means for isolating said vane tip from said shroud ring portion being disposed in each of the openings; and
  each of said vane tips being engaged with said vane shroud by retaining means for restricting movement of the vane tip in an axial direction relative to said vane shroud.

7. The vane assembly as defined in claim 6, wherein the first retaining means includes a slot defined in one of the vane tip and the vane shroud and a male retaining member disposed on the other of the vane tip and the vane shroud and corresponding to the slot for mating therewith.

8. The vane assembly as defined in claim 7, wherein said slot radially extends in the vane tip and said male retaining member received therein includes a portion of the shroud web portion.

9. A method for attaching a vane tip in a vane assembly of a gas turbine engine, the method comprising the steps of:
  forming a shroud ring having a plurality of openings distributed about a circumference thereof and a web extending radially from the shroud ring across the plurality of openings;
  installing a grommet in each of the plurality of openings, such that a cutout extending therethrough is aligned with the openings,
  providing a plurality of vanes, each having a radially extending slot defined in a vane tip thereof; and
  inserting each vane tip into said cutouts of the grommets within said opening of the shroud ring so that the web is received within each radially extending slot.

10. The method as defined in claim 9, further including a step of forming a lip bordering the cutout of the grommet with a pair of spaced apart tongues extending radially from the lip to define a slit therein, and wherein the grommet is installed such that the web is received within the slit, and the vane tip is inserted so that the spaced apart tongues are received in the radially extending slot.

11. The method as defined in claim 9, further comprising a step of forming a mating recess in the web adjacent each of the openings, so that the web is received in the radially extending slot of the vane tip at the mating recess.

\* \* \* \* \*